April 12, 1960     W. GALBRAITH     2,932,539

SUN VISORS

Filed April 23, 1958

WILLIAM GALBRAITH
INVENTOR.

BY *James L. Givnan*
ATT'Y

United States Patent Office 2,932,539
Patented Apr. 12, 1960

2,932,539

SUN VISORS

William Galbraith, Albany, Oreg.

Application April 23, 1958, Serial No. 730,360

2 Claims. (Cl. 296—97)

This invention relates to sun visors for automotive vehicles. More particularly the invention embraces a slidably and/or tiltably positionable visor which may be made of flexible tinted transparent or translucent or opaque material.

It is one of the principal objects of this invention to provide a single visor for each front half of a vehicle windshield slidably supported so that each visor may be slid transversely of its respective half of the windshield and longitudinally of its respective side of the vehicle body relative to the windows thereof.

Another object of the invention is to provide a visor of the character described which can be readily positioned within or without the field of vision of the vehicle operator by merely sliding the visor along or swinging it about the axis of a single rail paralleling the windshield and curved rearwardly from one side thereof into parallelism with a side window.

A further object is to provide a visor which is firmly held and thus not capable of shifting its position due to sudden jarring, stopping or similar irregularities which occur in the course of vehicle operation.

A still further object is to provide a visor and mounting therefor as above stated which may be readily attached to the interior of the top of an automobile body without altering or marring the structure or trim found in average automobiles.

The foregoing and other objects and advantages which will become subsequently apparent reside in the details of construction and operation as more fully hereinafter described and claimed, reference being had to the accompanying drawing forming a part hereof, and in which:

Figure 1:
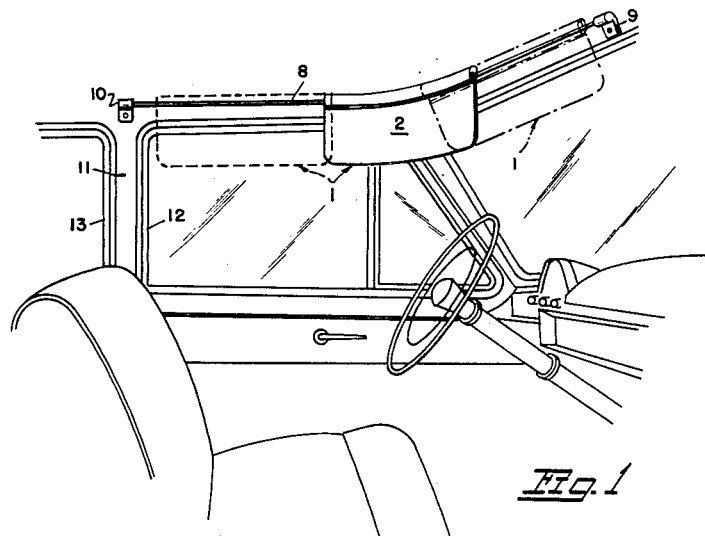
Figure 1 is a fragmentary interior view of an automobile body provided with a visor and mounting therefor in accordance with my invention.

With continuing reference to the drawing, wherein like reference characters designate like parts, reference numeral 1 indicates generally the sun visor in its entirety installed on the inside of an automobile body directly behind and above the windshield and adapted to be shifted to various selected positions crosswise of the windshield, crosswise of the side window as well as to a position therebetween as shown respectively in broken, dotted and full lines in Figure 1.

The visor comprises a sheet 2 of any of a wide variety of recently developed flexible tinted plastic materials such as Plexiglass, Accolite, Vinylite and the like, or if desired, the sheet could be made of flexible opaque material such as fibre or similar material and fabric covered to enhance its appearance or to match the upholstery or interior lining of the automobile body.

Figure 3:
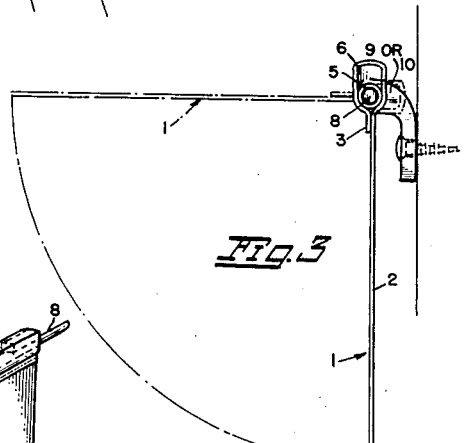
Figure 3 is an end view of the visor showing it in an operative position in full lines and inoperative in broken lines.
Figure 2:
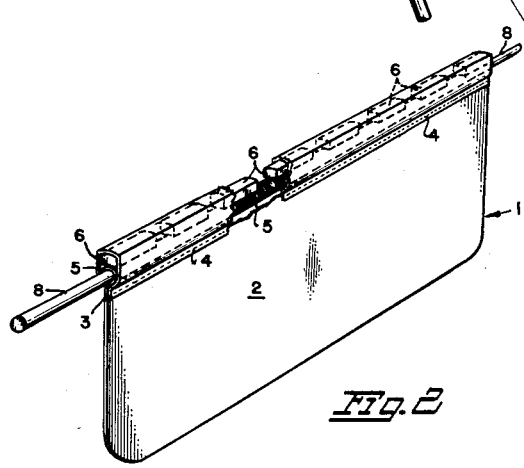
Figure 2 is a perspective view of the visor on an enlarged scale and with a fragment broken away for convenience of illustration.

The top marginal edge of the visor material (Figure 2) is folded over on itself as at 3 and stapled, fused or otherwise secured as at 4 to enclose a coil spring 5 coextensive with the length of the visor and a plurality of weights 6 superimposed upon the spring and spaced apart throughout the length thereof as shown. By means of the spring 5, which is circumferentially expandable, the visor is mounted upon a single supporting rail 8 attached at both of its ends to brackets 9 and 10 secured to the automobile body respectively above the center of the windshield and above a divider 11 between the front door 12 and rear door 13. The top end of each bracket 9 and 10 is curved outwardly away from its point of attachment as shown in Figure 3 to provide clearance for the top of the visor when it is swung about the axis of the supporting rail into any desired position.

The material from which the visor is made is of sufficient stiffness to maintain its flat rectangular shape in and during adjustable movement to a desired position, yet is sufficiently flexible to follow the curve in the supporting rail 8. The frictional engagement of the spring 5 with the supporting rail provides sufficient resistance to unintentional movement of the visor so that it will remain in the position to which it is adjusted lengthwise of the rail without the need of set screws or similar fastening elements, and the weights 6 counterbalancing the weight of the visor will maintain it in any position to which it is swung about the axis of the supporting rail.

Figure 4:
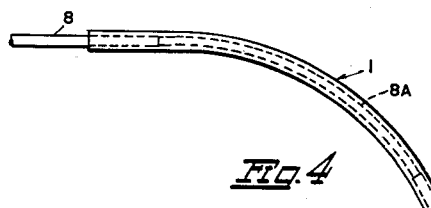
Figure 4 is a top plan view of the visor showing its flexibility for negotiating the turn in the supporting means from the area of the windshield to that of a side window.

To facilitate movement of the visor across the corner of the vehicle body, the corresponding curved portion of the supporting rail 8 is slightly reduced in diameter as shown in Figure 4 and indicated at 8A.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A sun visor and support therefor for installation within a vehicle body having a windshield at the forward end and at least one side window at substantially right angles to the windshield, said visor support comprising a single rod mounted within the vehicle body and extending across the windshield, curved rearwardly at one side thereof and extending rearwardly along the window on a plane thereabove, said visor comprising a sheet of flexible material having a top edge and a bottom edge and folded over on itself along its top edge to provide a tubular housing, a coil spring secured within said tubular housing and coiled about said rod in frictional engagement therewith, a plurality of spaced-apart counterweights secured within said tubular housing above said coil spring, whereby the visor will be held stationary in any set position relative to the rod at any point within the length thereof.

2. A sun visor and support therefor for installation within a vehicle body having a windshield at the forward end and at least one side window at substantially right angles to the windshield, said visor support comprising a single rod mounted within the vehicle body and extending across the windshield, curved rearwardly at one side thereof and extending rearwardly along the window on a plane thereabove, said rod being reduced in diameter along its curved portion, said visor comprising a sheet of flexible material of greater length than the length of said reduced portion of the rod and having a top edge and a bottom edge, said visor being folded over on itself along its top edge to provide a tubular housing throughout the length thereof, a coil spring co-extensive in length with that of the visor and secured within said tubular housing and coiled about said rod in frictional engagement therewith, a plurality of counterweights secured within the housing above said coil spring and spaced-apart relative to each other throughout the length of the spring whereby the visor will be held stationary in any set position relative to the rod along said straight portions thereof and around the curved portion thereof and whereby said reduced diameter of the rod will facilitate movement of the visor along said curved portion.

References Cited in the file of this patent

UNITED STATES PATENTS

| | | |
|---|---|---|
| 1,795,184 | Smith | Mar. 3, 1931 |
| 1,932,475 | Peteler | Oct. 31, 1933 |
| 2,703,255 | Penwell | Mar. 1, 1955 |

FOREIGN PATENTS

| | | |
|---|---|---|
| 1,104,147 | France | June 8, 1055 |